UNITED STATES PATENT OFFICE.

WILHELM MAJERT, OF BERLIN, GERMANY.

AROMATIC GLYCOCOL DERIVATIVE.

SPECIFICATION forming part of Letters Patent No. 543,214, dated July 23, 1895.

Application filed July 7, 1891. Serial No. 398,729. (No specimens.) Patented in England March 24, 1891, No. 5,269; in Luxemburg March 24, 1891, No. 1,426, and in Italy March 31, 1891, XXV, 29,336, and LVII, 351.

*To all whom it may concern:*

Be it known that I, WILHELM MAJERT, doctor of philosophy and chemist, a subject of the King of Prussia, German Emperor, residing at 10 Madaistrasse, Berlin, Prussia, German Empire, have invented certain new and useful Improvements in the Manufacture of Aromatic Glycocol Derivatives; and I do hereby declare the following to be a full, clear, and exact description of the invention, such as will enable others skilled in the art to which it appertains to make and use the same, and for which Letters Patent have been obtained in Great Britain, No. 5,269, dated March 24, 1891; in Italy, Vol. XXV, No. 29,336, Vol. LVII, No. 351, dated March 31, 1891, and in Luxemburg, No. 1,426, dated March 24, 1891.

By the action of alcoholic ammonia upon chloracetanilid at a temperature of about 100° centigrade Meyer obtained diglycolamidacetanilid, and according to Tommasi an amorphous body is obtained by the action of alcoholic ammonia upon chloracetanilid at a temperature of from 40° to 50° centigrade, which at 65° centigrade becomes soft, and melts at 115° centigrade, the product having two acetamid remainders bound to one nitrogen atom and contains the group—

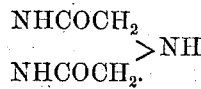

This amorphous body is insoluble in water, and Tommasi's formula therefor is $$CH_2(OH)CONHC_6H_5 + H_2O.$$

According to my discovery the action of alcoholic ammonia upon chloracetanilid or bromacetanilid results in the formation of two bodies—namely, glycocolanilid and diglycocolanilid. The former is obtained in greater quantities when ammonia is used in excess, while the latter is especially the result of the use of theoretic quantities of the chemicals. In lieu of the ammonia, dimethylamin may be used, dimethyl glycocolanilid being exclusively obtained. These new products have but one acetamid remainder ($RNHCOCH_2$) bound to one nitrogen atom and contain the group . Said new products are obtained by the reaction of glycocolether or glycocolamid upon primary aromatic amins, the best results being obtained by using the hydrochlorids of the glycocolethers or of glycocolamids. The reaction takes place according to the following equations:

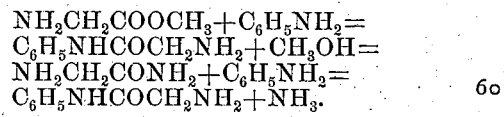

The glycocol products thus obtained are readily soluble in water and alcohol, but not as readily soluble in benzoic ether and ligroin, while those bodies derived from dimethylamin are nearly insoluble in water.

The glycocol derivatives are strong bases that turn litmus paper blue and evolve ammonia from their salts when heated, while ammonia separates the said derivatives from their said salts at low temperatures. They greedily absorb carbonic acid from the air and form, even with mineral acids, solid neutrally-reacting salts, while the salts of the glycocoldimethylamid acid derivatives deliquesce in the air. The diglycocol products, on the contrary, dissolve with difficulty in water and show a weak basic character. An aqueous solution thereof does not turn red litmus paper blue, the salts becoming dissociated in water.

According to my process I obtain—

First. Glycocolanilid,

crystallizes with one and one-half molecules water into solid or compact needles whose melting-point is 62° centigrade, and if these are melted and again allowed to crystallize the melting-point thereof will be 55° centigrade. The diglycocolanilid melts at 140.5°.

Second. Dimethylglycocolanilid,

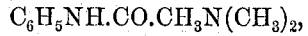

crystallizes out of ligroin in large brilliant leaves that melt at 35° centigrade, the salts being deliquescent.

Third. Glycocolorthotoluidin,

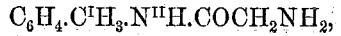

crystallizes out of water in long brilliant needles and melts at 66° centigrade. The diglycocolorthotoluidin melts at 155° centigrade.

Fourth. Glycocolmetatoluidin,

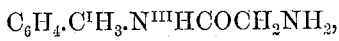

crystallizes out of water, in which it is rather difficult of solution, in the form of long spears, and melts at 74° centigrade. The diglycocolmetatoluidin melts at about 220° to 221° centigrade.

Fifth. Glycocolparatoluidin,

crystallizes in long needles holding water, that melt at from 94° to 95° centigrade, and when free from water of crystallization at about 107° centigrade.

Sixth. Glycocolorthoanisidin,

crystallizes into broad short needles and melts at about 82° to 85° centigrade. In the production of this chemical but little diglycocolorthoanisidin is formed.

Seventh. Glycocolmetaanisidin,

crystallizes into brilliant leaves that melt at about 96° centigrade, while the diproduct melts at about 116° centigrade.

Eighth. Glycocolparaanisidin,

crystallizes into needles and melts at about 89° centigrade, while the diproduct melts at about 142° centigrade.

Ninth. Glycocolorthophenetidin,

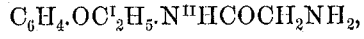

is not as readily soluble as the anisidin derivate, melts at 66° centigrade, and but little of the diproduct is formed in its production.

Tenth. Glycocolmetaphenetidin,

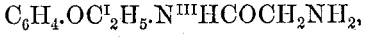

melts at 92° centigrade, while the diglycocolamidacidmetaphenetidin melts at about 130° to 131° centigrade.

Eleventh. Glycocolparaphenetidin,

crystallizes with one molecule water into long needles that melt at about 95° centigrade and when free from water of crystallization melt at about 100.5° centigrade. By repeated determination of the molecular weight, according to Raoult, the molecular weight of the acetic-acid salt has been found to be, on an average, two hundred and sixty instead of two hundred and fifty-four, and a chlorin test of the hydrochlorid yielded 15.77 per cent. of chlorin instead of 15.40 per cent. The diproduct melts at 157° centigrade.

Twelfth. Dimethylglycocolparaphenetidin, $C_6H_4.OC^I_2H_5.N^{IV}HCOCH_2N(CH_3)_2$, forms in contact with air very deliquescent salts, is difficult of solution in water, and crystallizes out of ether into brilliant leaves that melt at about 50° centigrade.

Thirteenth. Glycocoldiphenylamin,

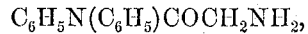

forms, and more especially in salt solution, a supersalt that is very difficult of solution, while the free base is readily soluble in water and ligroin. The salt melts at about 38° to 40° centigrade, while the diproduct is very difficult of solution in water, and melts at a temperature above 240° centigrade under roasting or browning.

I will now describe the process of obtaining the products hereinabove mentioned. First, by a proper selection of any one of the following chlorids or bromids of acetanilid, acetortho meta or para toluidin, acetortho meta or para anisidin, acetortho meta or para phenetidin, or acetdiphenylamin. I take ten kilos of one of these chemicals and dissolve it in a suitable closed vessel in from two hundred and fifty to three hundred and fifty kilos (according to the chemical used) of the strongest alcoholic ammonia and allow it to digest for from twelve to twenty-four hours at a temperature of from 50° to 60° centigrade. The ammonia is then driven off to be again used for the saturation of alcohol. The separation of the ammonia from the alcohol may be effected by any well-known means, as by distillation in conjunction with a reflex-current condenser or cooler, under the cooling action of which the alcohol is condensed and the ammoniacal gas separated in a well-known manner. After the ammonia has been eliminated the alcohol is distilled off. The residue is then boiled in a large volume of water, allowed to cool, and the liquid is separated from any undissolved and useless matter by filtration. The filtrate is then concentrated by evaporation, allowed to cool, and ammonia is added in such quantity as to show a very weak alkaline reaction. This results in the separation of a small portion of a gummy or resinous substance. If the clear filtrate is now mixed with an excess of ammonia, it soon crystallizes into a crystalline magma of separated glycocol derivatives, which is separated from the liquid, while the latter is concentrated for use in the process. The hydrochlorids are best obtained by dissolving the glycocol derivatives in about twenty parts of alcohol of a strength of about ninety-six per cent. and by adding to the hot solution the required quantity of concentrated hydrochloric acid. On cooling the hydrochlorid separates in most cases in fine needles. Instead of the alcoholic ammonia an aqueous solution of ammonia may be used, but the results are not so satisfactory. In a like manner the conversion can be effected by allowing the solution to stand for some time in a cold temperature, or by heating it for a short time to a high temperature, say about 110° centigrade.

Secondly. By the use of the chlorid or bromid of acetanilid or acetparaphenetidin, ten kilos of either of which are heated for about twenty-four hours to from 50° to 60° in a closed vessel containing about 100 kilos of an aqueous or alcoholic solution of dimethylamin of a strength of from six to seven per cent. The water or alcohol is then distilled off and the residue taken up in as little water as possible, which water is slightly acidulated with hydrochloric acid and filtered, the filtrate being then precipitated with ammonia. In most cases the glycocol derivative is an oily one, and by combining it with ligroin and cooling the compound, or by evaporation of the solvent, the derivate is obtained in a crystallized form.

In the process first hereinabove described, either methyl-dimethyl aethyl or diaethylamin may be substituted for the ammonia.

Thirdly. I heat in or about in the proportions set forth, to wit: 12.25 kilos hydrochlorate of glycocolmethylether, or 13.95 kilos hydrochlorate of glycocolaethylether, or 10.05 kilos hydrochlorate of glycocolamide and 18.6 kilos anilin, or 21.4 kilos ortho or meta or para toluidin, or 24.6 kilos ortho or meta or para anisidin, or 27.4 kilos ortho or meta or para phenetidin from five to six hours at a temperature of from 130° to 150° centigrade. The reaction takes place under formation of methyl or æthyl alcohol or ammonia. After the reaction is completed the unaltered aromatic amin is driven off by means of steam, the residue dissolved in hot water slightly acidulated with hydrochloric acid, and the solution is then filtered and allowed to cool. Ammonia is now added to the cold solution until it shows a slight alkaline reaction, and the small quantity of resinous matter formed filtered off, when the major portion of the aromatic glycocolamin may be precipitated by the addition to the solution of an excess of ammonia, a further quantum of aromatic glycocolamin being obtained from the liquor by evaporation.

The following chloraceticacid combinations of the aromatic amins heretofore unknown are adapted for use in my process, namely: first, chloracetmethylanilid; second, chloracetorthotoluidin; third, chloracetmetatoluidin; fourth, chloracetorthoanisidin; fifth, chloracetmetaanisidin; sixth, chloracetparaanisidin; seventh, chloracetorthophenetidin; eighth, chloracetmetaphenetidin; ninth, chloracetparaphenetidin, and, tenth, chloracetdimethylamin, as well as the corresponding bromaceticacid combinations, can be obtained either by the action of one molecule of chloraceticacid and one molecule of anhydrous phosphoric acid upon one molecule of either of the following chemicals, to wit: first, methylanilin; second, orthotoluidin; third, metatoluidin; fourth, orthoanisidin; fifth, metaanisidin; sixth, paraanisidin; seventh, orthophenetidin; eighth, metaphenetidin; ninth, paraphenetidin, and, tenth, diphenylamin, or in a manner similar to that of the chloracetanilid by the action of one molecule of chloracetylchlorid or one molecule of bromacetylchlorid upon two molecules of ortho or meta toluidin, or upon two molecules of ortho meta or paraanisidin or phenetidin, or upon two molecules of diphenylamin. The hydroclorids of the glycocol products are of great therapeutic value, one gram of the hydrochlorid—for instance, of chlorid of phenocol—will lower a fever-temperature two degrees inside of half an hour, while it requires two grams of antipyrin supplemented by one gram of phenacetin to produce the same result.

Like antipyrin, large doses have no detrimental effect upon the human system, nor does the new chemical produce either cyanosis or collapse.

Having described my invention, what I claim is—

1. The process of obtaining aromatic glycocol derivates which consists in treating a suitable amine with a haloid combination of a hydrocarbon compound such as described, in the presence of an excess of ammonia, driving off the ammonia, boiling in water, filtering, alkalizing the filtrate, and crystallizing the glycocol derivative out of the filtrate by means of an exess of ammonia, substantially as set forth.

2. The process of obtaining glycocol derivates, which consists in treating a glycocol compound such as described with an aqueous or alcoholic solution of a primary aromatic amin, and separating the derivative by means of an excess of ammonia, substantially as described.

3. The herein-described crystallizable or crystalline glycocol derivatives having but one acetamid remainder bound to one nitrogen atom and containing the group $NHCO\,CH_2NH_2$ the free bases of said derivatives having strong chemical affinities and being set free from their compounds by ammonia at low temperatures, and liberating ammonia from its compounds when heated.

WILHELM MAJERT.

Witnesses:
ADOLF DEMELIUS,
RICHARD SCHMIDT.